(12) United States Patent
Yokoyama et al.

(10) Patent No.: US 12,409,743 B2
(45) Date of Patent: Sep. 9, 2025

(54) POWER SUPPLY SYSTEM, POWER SUPPLY APPARATUS, AND POWER SUPPLY METHOD

(71) Applicant: TOYOTA JIDOSHA KABUSHIKI KAISHA, Aichi-ken (JP)

(72) Inventors: Daiki Yokoyama, Gotemba (JP); Toshiya Hashimoto, Miyoshi (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 721 days.

(21) Appl. No.: 17/844,729

(22) Filed: Jun. 21, 2022

(65) Prior Publication Data
US 2022/0402381 A1 Dec. 22, 2022

(30) Foreign Application Priority Data
Jun. 22, 2021 (JP) .................. 2021-103017

(51) Int. Cl.
| | |
|---|---|
| *B60L 53/12* | (2019.01) |
| *B60L 9/00* | (2019.01) |
| *H02J 50/12* | (2016.01) |
| *H02J 50/80* | (2016.01) |
| *H02J 7/00* | (2006.01) |

(52) U.S. Cl.
CPC .............. *B60L 53/12* (2019.02); *B60L 9/00* (2013.01); *H02J 50/12* (2016.02); *H02J 50/80* (2016.02); *B60L 2240/68* (2013.01); *H02J 7/00712* (2020.01)

(58) Field of Classification Search
CPC .. B60L 9/00; B60L 53/00; B60L 53/10; B60L 53/12; B60L 53/126; B60L 53/32; H02J 50/10; H02J 50/12; H02J 50/80

USPC ........................................................ 191/10
See application file for complete search history.

(56) References Cited

U.S. PATENT DOCUMENTS

2019/0202298 A1* 7/2019 Shin .................... B60L 9/00

FOREIGN PATENT DOCUMENTS

| EP | 3919315 A1 | 12/2021 |
|---|---|---|
| JP | 2009298278 A | 12/2009 |
| JP | 2018-157686 A | 10/2018 |
| KR | 10-2020-0096401 A | 8/2020 |
| WO | WO-2021245555 A1 * | 12/2021 |

\* cited by examiner

*Primary Examiner* — S. Joseph Morano
*Assistant Examiner* — Heaven R Buffington
(74) *Attorney, Agent, or Firm* — HAUPTMAN HAM, LLP

(57) ABSTRACT

The power supply system includes a plurality of power supply apparatuses configured to transmit power to vehicles by non-contact. The plurality of power supply apparatuses includes a first power supply apparatus installed in a first region positioned on a road directly connected to an exit of an area in which operation of internal combustion engines is prohibited or restricted and where an amount of traffic of vehicles at least temporarily becomes equal to or greater than a predetermined threshold value, and a second power supply apparatus installed in a second region different from the first region. An amount of power supplied from the first power supply apparatus to a vehicle is made greater than an amount of power supplied from the second power supply apparatus to a vehicle.

11 Claims, 10 Drawing Sheets

POWER SUPPLY SYSTEM, POWER SUPPLY APPARATUS, AND POWER SUPPLY METHOD

RELATED APPLICATIONS

The present application claims priority of Japanese Patent Application No. 2021-103017 filed Jun. 22, 2021, the disclosure of which is hereby incorporated by reference herein in its entirety.

FIELD

The present disclosure relates to a power supply system, a power supply apparatus, and a power supply method.

BACKGROUND

Known in the past has been the art of using a transmission method such as magnetic field resonance coupling to transmit power from a power supply apparatus provided on the ground surface to a vehicle by non-contact (for example, PTL 1). By using such art, it is possible to make a power supply apparatus charge a battery of a vehicle while the vehicle is running.

CITATION LIST

Patent Literature

[PTL 1] Japanese Unexamined Patent Publication No. 2018-157686

SUMMARY

Technical Problem

In this regard, in recent years, in order to reduce air pollution, at locations such as urban areas with large amounts of traffic, an area where operation of internal combustion engines while the vehicles are running is prohibited or restricted (engine limited operation areas) has been set up. When hybrid vehicles run through a such area, they have to run in the EV mode where their engines are made to stop and only their motors are used to output drive power for running use.

As a result, the amount of consumption of electric power of a vehicle becomes greater in an engine limited operation area and the state of charge (SOC) of the battery of the vehicle falls. For this reason, right after a vehicle leaves an engine limited operation area, the engine of the vehicle is often started up so as to charge the battery of the vehicle. However, in most vehicles, if the engine is started up in the surroundings of an engine limited operation area, the noise, exhaust emissions, etc. are liable to degrade the environment in the surroundings of the engine limited operation area.

For this reason, in order to avoid startup of internal combustion engines, it may be considered to charge the batteries of vehicles leaving an engine limited operation area by supplying power by non-contact from a power supply apparatus to the vehicles. However, if supplying power by non-contact to vehicles from a power supply apparatus without restriction, the amount of consumption of power for supplying power by non-contact would become excessive.

Therefore, in consideration of the above problem, an object of the present disclosure is to keep down the amount of consumption of power due to non-contact power supply to vehicles from a power supply apparatus while keeping the environment around an engine limited operation area from being degraded.

Solution to Problem

The summary of the present disclosure is as follows.

(1) A power supply system comprising a plurality of power supply apparatuses configured to transmit power to vehicles by non-contact, wherein the plurality of power supply apparatuses comprise: a first power supply apparatus installed in a first region positioned on a road directly connected to an exit of an area in which operation of internal combustion engines is prohibited or restricted and where an amount of traffic of vehicles at least temporarily becomes equal to or greater than a predetermined threshold value; and a second power supply apparatus installed in a second region different from the first region, and an amount of power supplied from the first power supply apparatus to a vehicle is made greater than an amount of power supplied from the second power supply apparatus to a vehicle.

(2) The power supply system described in above (1), wherein the first region is positioned in the area.

(3) The power supply system described in above (1) or (2), wherein the first power supply apparatus increases the amount of power supplied to a vehicle when an amount of traffic of vehicles in the first region is equal to or greater than the threshold value, compared to when the amount of traffic is less than the threshold value.

(4) The power supply system described in above (3), further comprising a server able to communicate with the first power supply apparatus, wherein the server acquires the amount of traffic of vehicles in the first region and, when the amount of traffic is equal to or greater than the threshold value, transmits an instruction to increase the amount of power supply to a vehicle to the first power supply apparatus.

(5) The power supply system described in above (4), wherein the server acquires a concentration of carbon dioxide in the atmosphere in a vicinity of the exit of the area and sets the threshold value based on the concentration of carbon dioxide.

(6) The power supply system described in above any one of (1) to (5), wherein the first power supply apparatus increases the amount of power supply to a vehicle only if a hybrid vehicle passes through the first region.

(7) The power supply system described in any one of above (1) to (5), wherein the first power supply apparatus increases the amount of power supply to a vehicle only if a hybrid vehicle with an SOC of a battery of equal to or less than a predetermined value passes through the first region.

(8) The power supply system described in any one of above (1) to (7), wherein the area is a limited time area where operation of internal combustion engines is prohibited or restricted in predetermined hours, and the first power supply apparatus increases the amount of power supply to a vehicle only in a predetermined set time period including at least a part of the predetermined hours.

(9) The power supply system described in above (8), wherein an end point of the set time period is set to a point after the predetermined hours.

(10) A power supply apparatus configured to transmit power to a vehicle by non-contact, wherein the power supply apparatus is installed in a predetermined region on a road directly connected to an exit of an area in which operation of internal combustion engines is prohibited or restricted and increases an amount of power supply to a vehicle when an amount of traffic of vehicles in the predetermined region is equal to or greater than a predetermined threshold value, compared to when the amount of traffic is less than the threshold value.

(11) A power supply method using a plurality of power supply apparatuses configured to transmit power to vehicles by non-contact, wherein the plurality of power supply apparatuses comprise: a first power supply apparatus installed in a first region positioned on a road directly connected to an exit of an area in which operation of internal combustion engines is prohibited or restricted and where an amount of traffic of vehicles at least temporarily becomes equal to or greater than a predetermined threshold value; and a second power supply apparatus installed in a second region different from the first region, and an amount of power supplied from the first power supply apparatus to a vehicle is made greater than an amount of power supplied from the second power supply apparatus to a vehicle.

According to the present disclosure, it is possible to keep down the amount of consumption of power due to non-contact power supply to vehicles from a power supply apparatus while keeping the environment around an engine limited operation area from being degraded.

DESCRIPTION OF EMBODIMENTS

Figure 1:
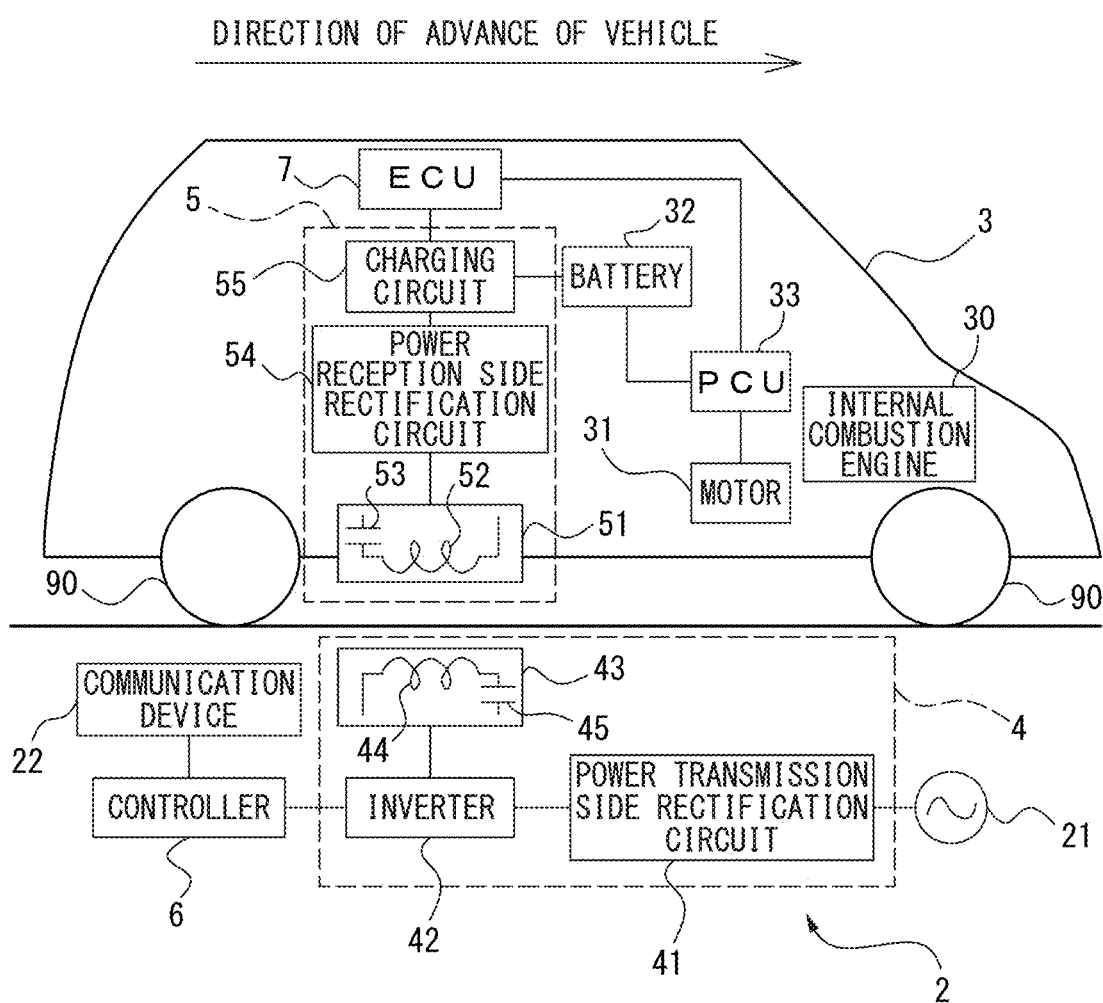
FIG. 1 is a view schematically showing a configuration for performing non-contact power supply from a power supply apparatus to a vehicle.

Below, referring to the drawings, embodiments of the present disclosure will be explained. Note that, in the following explanation, similar component elements will be assigned the same reference notations.

First Embodiment

First, referring to FIG. 1 to FIG. 4, a first embodiment of the present disclosure will be explained.

In recent years, in order to reduce air pollution, at locations such as urban areas with large amounts of traffic, an area where operation of internal combustion engines when vehicles are running is prohibited or restricted (engine limited operation areas) has been set up. When hybrid vehicles run through a such area, they have to run in the EV mode where their engines are made to stop and only their motors are used to output drive power for running use.

As a result, the amount of electric power of a vehicle consumed in the engine limited operation area increases and the state of charge (SOC) of a battery of the vehicle falls. For this reason, the internal combustion engine of a vehicle is more frequently started to charge the battery of the vehicle right after a vehicle leaves the engine limited operation area. However, if internal combustion engines are started up in the surroundings of the engine limited operation area in many vehicles, noise, exhaust emission, etc. are liable to degrade the environment in the surroundings of the engine limited operation area.

For this reason, in order to avoid startup of internal combustion engines, it may be considered to provide a road with power supply apparatuses able to supply power to vehicles while running by non-contact and charge the batteries of vehicles leaving an engine limited operation area by supply of power by non-contact from the power supply apparatuses to the vehicles. Below, one example of the configuration for non-contact power supply will be explained.

FIG. 1 is a view schematically showing the configuration for performing non-contact power supply from a power supply apparatus 2 to a vehicle 3. The power supply apparatus 2 is provided at a road. When the vehicle 3 is passing over that road, non-contact power supply is performed from the power supply apparatus 2 to the vehicle 3. That is, the power supply apparatus 2 is configured to transmit power to the vehicle 3 by non-contact, while the vehicle 3 is configured to be supplied with power by non-contact from the power supply apparatus 2. Specifically, the power supply apparatus 2 is provided with a power transmission apparatus 4 configured so as to transmit power by non-contact, while the vehicle 3 is provided with a power reception apparatus 5 configured to receive power by non-contact from the power transmission apparatus 4.

In particular, in the present embodiment, non-contact power supply from the power supply apparatus 2 to the vehicle 3 is performed by magnetic field resonance coupling (magnetic field resonance). That is, the power supply apparatus 2 transmits power to the vehicle 3 using a magnetic field as a medium. Note that, non-contact power supply is also referred to as non-contact power transfer, wireless power transfer, or wireless power supply.

As shown in FIG. 1, the power supply apparatus 2 is provided with, in addition to the power transmission apparatus 4, a power supply 21, controller 6, and communication device 22. The power supply apparatus 2 is provided at a road (lane) over which the vehicle 3 will pass, for example, is buried in the ground (under the road surface). Note that, at least a part of the power supply apparatus 2 (for example, the power supply 21, the controller 6, and the communication device 22) may be arranged on the road surface.

The power supply 21 is the power source of the power transmission apparatus 4 and supplies power to the power transmission apparatus 4. The power supply 21, for example, is a commercial alternating current power supply supplying single-phase alternating current power. Note that, the power supply 21 may also be an alternating current power supply supplying three-phase alternating current power etc.

The power transmission apparatus 4 is provided with a power transmission side rectification circuit 41, inverter 42, and power transmission side resonance circuit 43. In the power transmission apparatus 4, suitable alternating current power (high frequency power) is supplied through the power transmission side rectification circuit 41 and the inverter 42 to the power transmission side resonance circuit 43.

The power transmission side rectification circuit 41 is electrically connected to the power supply 21 and the inverter 42. The power transmission side rectification circuit 41 rectifies the alternating current power supplied from the power supply 21 to direct current power and supplies the direct current power to the inverter 42. The power transmission side rectification circuit 41 is, for example, an AC/DC converter.

The inverter 42 is electrically connected to the power transmission side rectification circuit 41 and power transmission side resonance circuit 43. The inverter 42 converts the direct current power supplied from the power transmission side rectification circuit 41 to alternating current power of a frequency higher than the alternating current power of the power supply 21 (high frequency power) and supplies the high frequency power to the power transmission side resonance circuit 43.

The power transmission side resonance circuit 43 has a resonator comprised of a coil 44 and capacitor 45. The various parameters of the coil 44 and capacitor 45 (outside diameter and inside diameter of the coil 44, turns of the coil 44, electrostatic capacity of the capacitor 45, etc.) are determined so that the resonance frequency of the power transmission side resonance circuit 43 becomes a predetermined set value. The predetermined set value is, for example, 10 kHz to 100 GHz, preferably is the 85 kHz determined by the SAE TIR J2954 standard as the frequency band for non-contact power supply of vehicles.

The power transmission side resonance circuit 43 is arranged at the center of the lane over which the vehicle 3 passes so that the center of the coil 44 is positioned at the center of the lane. If high frequency power supplied from the inverter 42 is applied to the power transmission side resonance circuit 43, the power transmission side resonance circuit 43 generates an alternating current magnetic field for transmitting the power. Note that, the power supply 21 may be a fuel cell or solar cell or other such direct current power supply. In this case, the power transmission side rectification circuit 41 may be omitted.

The controller 6 is, for example, a general use computer and performs various control of the power supply apparatus 2. For example, the controller 6 is electrically connected to the inverter 42 of the power transmission apparatus 4 and controls the inverter 42 so as to control the power transmission by the power transmission apparatus 4.

Figure 2:
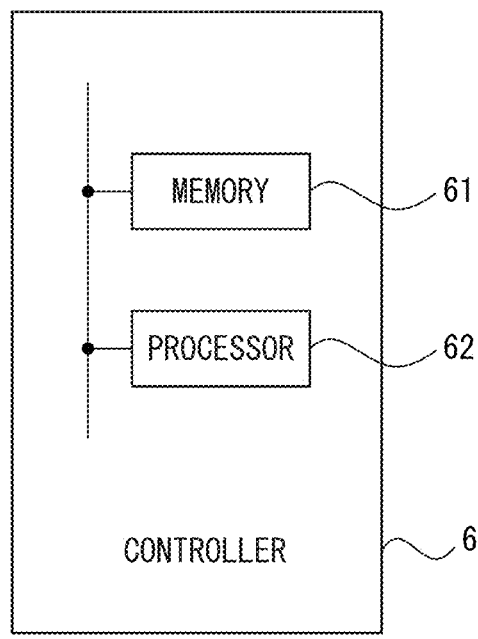
FIG. 2 is a schematic view of a configuration of a controller.

FIG. 2 is a schematic view of the configuration of the controller 6. The controller 6 is provided with a memory 61 and a processor 62. The memory 61 and the processor 62 are connected with each other through signal wires. Note that, the controller 6 may be further provided with a communication interface etc. for connecting the controller 6 to a communication network such as the Internet.

The memory 61 has, for example, a volatile semiconductor memory (for example, a RAM) and a nonvolatile semiconductor memory (for example, a ROM). The memory 61 stores programs to be run at the processor 62, various data used when various processing is performed by the processor 62, etc.

The processor 62 has one or more CPUs (central processing units) and their peripheral circuits and performs various processing. Note that, the processor 62 may also have a logic unit or arithmetic unit or other such processing circuit. The processor 62 is one example of a control part of the power supply apparatus 2.

The communication device 22 is equipment enabling communication between the power supply apparatus 2 and the outside of the power supply apparatus 2 (for example, a near field wireless communication module). The communication device 22 is electrically connected to the controller 6. The controller 6 communicates with the vehicle 3 through the communication device 22.

On the other hand, the vehicle 3, as shown in FIG. 1, is provided with, in addition to the power reception apparatus 5, an internal combustion engine 30, a motor 31, battery 32, power control unit (PCU) 33, and electronic control unit (ECU) 7. In the present embodiment, the vehicle 3 is a hybrid vehicle (HEV) and outputs drive power for running use by at least one of the internal combustion engine 30 and motor 31.

The internal combustion engine 30 burns a mixture of fuel and air in its cylinders to output power and, for example, is a gasoline engine or a diesel engine. The output of the internal combustion engine 30 is transmitted through a decelerator and an axle to the wheels 90.

The motor 31 is, for example, an alternating current synchronous motor and functions as a motor and a generator. When the motor 31 functions as a motor, the power stored in the battery 32 is used as the source of power for driving it. The output of the motor 31 is transmitted through a decelerator and axle to the wheels 90. On the other hand, at the time of deceleration of the vehicle 3, the motor 31 is driven by rotation of the wheels 90 and the motor 31 functions as a generator to produce regenerated power.

The battery 32 is a rechargeable secondary battery and is, for example, comprised of a lithium ion battery, nickel-hydrogen battery, etc. The battery 32 stores the power required for the vehicle 3 to run (for example, drive power of motor 31). If the regenerated power produced by the motor 31 is supplied to the battery 32, the battery 32 is charged and the state of charge of the battery 32 is restored. Further, the battery 32 can be charged by an outside power supply other than the power supply apparatus 2 through a charging port provided at the vehicle 3.

The PCU 33 is electrically connected to the battery 32 and motor 31. The PCU 33 has an inverter, booster converter, and DC/DC converter. The inverter converts the direct current power supplied from the battery 32 to alternating current power and supplies the alternating current power to the motor 31. On the other hand, the inverter converts the alternating current power generated by the motor 31 (regenerated power) to direct current power and supplies the direct current power to the battery 32. When the power stored in the battery 32 is supplied to the motor 31, the booster converter boosts the voltage of the battery 32 in accordance with need. When the power stored in the battery 32 is supplied to the headlights and other electronic equipment, the DC/DC converter lowers the voltage of the battery 32.

The power reception apparatus 5 is provided with a power reception side resonance circuit 51, power reception side rectification circuit 54, and charging circuit 55. The power reception apparatus 5 receives power from the power transmission apparatus 4 and supplies the received power to the battery 32.

The power reception side resonance circuit 51 is arranged at the bottom part of the vehicle 3 so that the distance from the road surface becomes smaller. In the present embodiment, the power reception side resonance circuit 51 is arranged at the center of the vehicle 3 in the vehicle width direction and is arranged between the front wheels 90 and the rear wheels 90 in the front-back direction of the vehicle 3.

The power reception side resonance circuit 51 has a configuration similar to the power transmission side resonance circuit 43 and has a resonator comprised of a coil 52 and capacitor 53. The various parameters of the coil 52 and capacitor 53 (outside diameter and inside diameter of the coil 52, turns of the coil 52, electrostatic capacity of the capacitor 53, etc.) are determined so that the resonance frequency of the power reception side resonance circuit 51 matches the resonance frequency of the power transmission side resonance circuit 43. Note that, if the amount of deviation of the resonance frequency of the power reception side resonance circuit 51 and the resonance frequency of the power transmission side resonance circuit 43 is small, for example, the resonance frequency of the power reception side resonance circuit 51 is within a range of ±20% of the resonance frequency of the power transmission side resonance circuit 43, the resonance frequency of the power reception side resonance circuit 51 does not necessarily have to match the resonance frequency of the power transmission side resonance circuit 43.

As shown in FIG. 1, when the power reception side resonance circuit 51 faces the power transmission side resonance circuit 43, if an alternating current magnetic field is generated at the power transmission side resonance circuit 43, the vibration of the alternating current magnetic field is transferred to the power reception side resonance circuit 51 which resonates by the same resonance frequency of the power transmission side resonance circuit 43. As a result, due to electromagnetic induction, an induction current flows to the power reception side resonance circuit 51, and due to the induction current, power is generated at the power reception side resonance circuit 51. That is, the power transmission side resonance circuit 43 transmits power to the power reception side resonance circuit 51 through a magnetic field, and the power reception side resonance circuit 51 receives power from the power transmission side resonance circuit 43 through a magnetic field.

The power reception side rectification circuit 54 is electrically connected to the power reception side resonance circuit 51 and the charging circuit 55. The power reception side rectification circuit 54 rectifies the alternating current power supplied from the power reception side resonance circuit 51 to convert it to direct current power and supplies the direct current power to the charging circuit 55. The power reception side rectification circuit 54 is, for example, an AC/DC converter.

The charging circuit 55 is electrically connected to the power reception side rectification circuit 54 and the battery 32. The charging circuit 55 converts the direct current power supplied from the power reception side rectification circuit 54 to the voltage level of the battery 32 and supplies it to the battery 32. If the power transmitted from the power transmission apparatus 4 is supplied by the power reception apparatus 5 to the battery 32, the battery 32 is charged and the SOC of the battery 32 is restored. The charging circuit 55 is, for example, a DC/DC converter.

The ECU 7 performs various types of control of the vehicle 3. For example, the ECU 7 is electrically connected to the charging circuit 55 of the power reception apparatus 5 and controls the charging circuit 55 to control charging of the battery 32 by the power transmitted from the power transmission apparatus 4. Further, the ECU 7 is electrically connected to the PCU 33 and controls the PCU 33 to control the transmission of power between the battery 32 and an electrical load (for example, the motor 31). Note that, the power reception apparatus 5 may supply the power received from the power transmission apparatus 4 to an electrical load (for example, the motor 31) instead of the battery 32.

Figure 3:
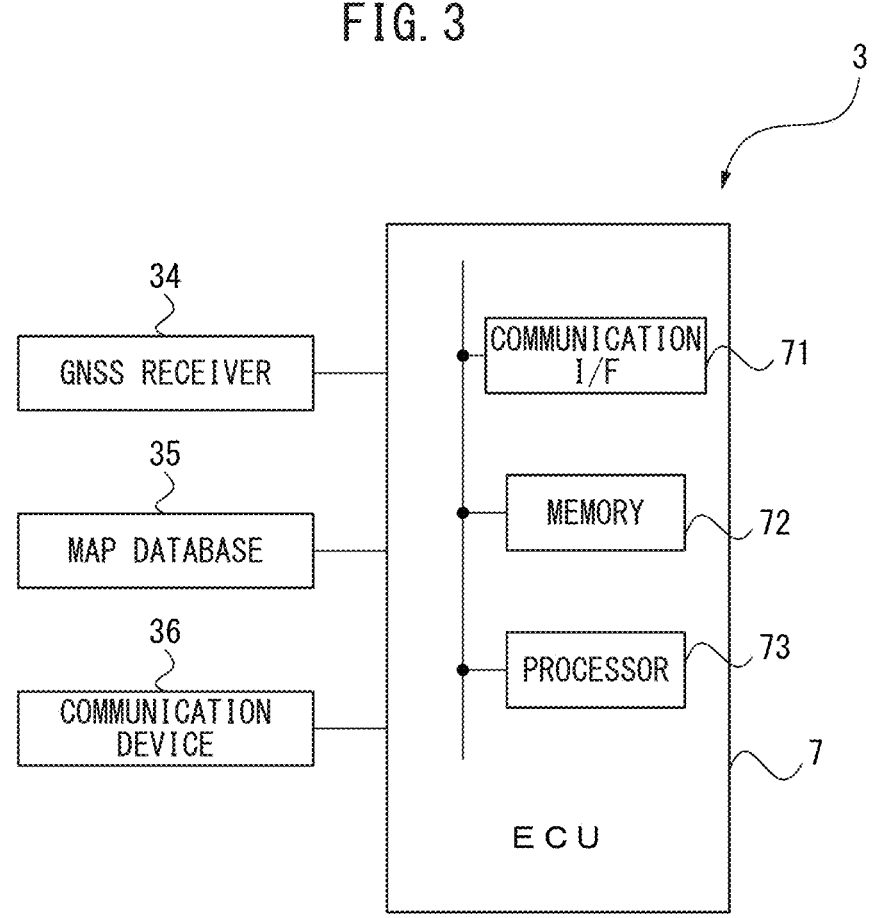
FIG. 3 is a view showing a schematic configuration of an ECU and other vehicle-mounted equipment.

FIG. 3 is a view showing a schematic configuration of the ECU 7 and other vehicle-mounted equipment. The ECU 7 has a communication interface 71, a memory 72, and a processor 73. The communication interface 71, the memory 72, and the processor 73 are connected together through signal wires.

The communication interface 71 has an interface circuit for connecting the ECU 7 to an internal vehicle network based on the CAN (Controller Area Network) or other standard.

The memory 72, for example, has a volatile semiconductor memory (for example, RAM) and nonvolatile semiconductor memory (for example, ROM). The memory 72 stores programs to be run at the processor 73, various data used when various processing is performed by the processor 73, etc.

The processor 73 has one or more CPUs (central processing units) and their peripheral circuits and performs various processing. Note that, the processor 73 may also have a logic unit or arithmetic unit or other such processing circuit.

Further, as shown in FIG. 3, the vehicle 3 is further provided with a GNSS receiver 34, map database 35, and communication device 36. The GNSS receiver 34, map database 35, and communication device 36 are electrically connected to the ECU 7.

The GNSS receiver 34 detects the current position of the vehicle 3 (for example, a latitude and longitude of the vehicle 3) based on position measurement information obtained from a plurality of (for example, three or more) positioning satellites. Specifically, the GNSS receiver 34 captures a plurality of positioning satellites and receives signals emitted from the positioning satellites. Further, the GNSS receiver 34 calculates the distances to the positioning satellites based on the difference between the times of emission and times of reception of the signals and detects the current position of the vehicle 3 based on the distances to the positioning satellites and the positions of the positioning satellites (orbital information). The output of the GNSS receiver 34, that is, the current position of the vehicle 3 detected by the GNSS receiver 34, is sent to the ECU 7.

Note that, "GNSS" (Global Navigation Satellite System) is a general name of the GPS of the U.S., GLONASS of Russia, Galileo of Europe, QZSS of Japan, BeiDou of China, IRNSS of India, and other satellite positioning systems. Therefore, the GNSS receiver 34 includes a GPS receiver.

The map database 35 stores map information. The map information includes position information of the power supply apparatuses 2, position information of the engine limited operation area, etc. The ECU 7 acquires map information from the map database 35. Note that, the map database 35 may be provided outside of the vehicle 3 (for example, the server etc.), and the ECU 7 may acquire map information from outside the vehicle 3.

The communication device 36 is equipment enabling communication between the vehicle 3 and the outside of the vehicle 3 (for example, near field wireless communication module, a data communication module (DCM) for connecting the vehicle 3 to a communication network such as the Internet, etc.) The ECU 7 communicates with the power supply apparatus 2 through the communication device 36.

For example, when the vehicle 3 approaches a power supply area in which a power supply apparatus 2 is installed, the ECU 7 uses the communication device 36 to transmit a power supply request signal requesting power supply from the power supply apparatus 2 to the vehicle 3. If the controller 6 of the power supply apparatus 2 receives a power supply request signal from the vehicle 3, it generates an alternating current magnetic field by the power transmission apparatus 4. As a result, power is supplied by non-contact from the power supply apparatus 2 to the vehicle 3.

Therefore, by using the power supply apparatus as mentioned above to charge a battery of a hybrid vehicle leaving an engine limited operation area, an internal combustion engine of the hybrid vehicle can be kept from being started up right after the hybrid vehicle leave the engine limited operation area. However, if supplying power by non-contact to vehicles from power supply apparatuses without restriction, the amount of consumption of power for non-contact power supply would become excessive. Therefore, in the present embodiment, the amount of power supply to vehicles from a power supply apparatus is determined considering the installation position of the power supply apparatus.

Figure 4:
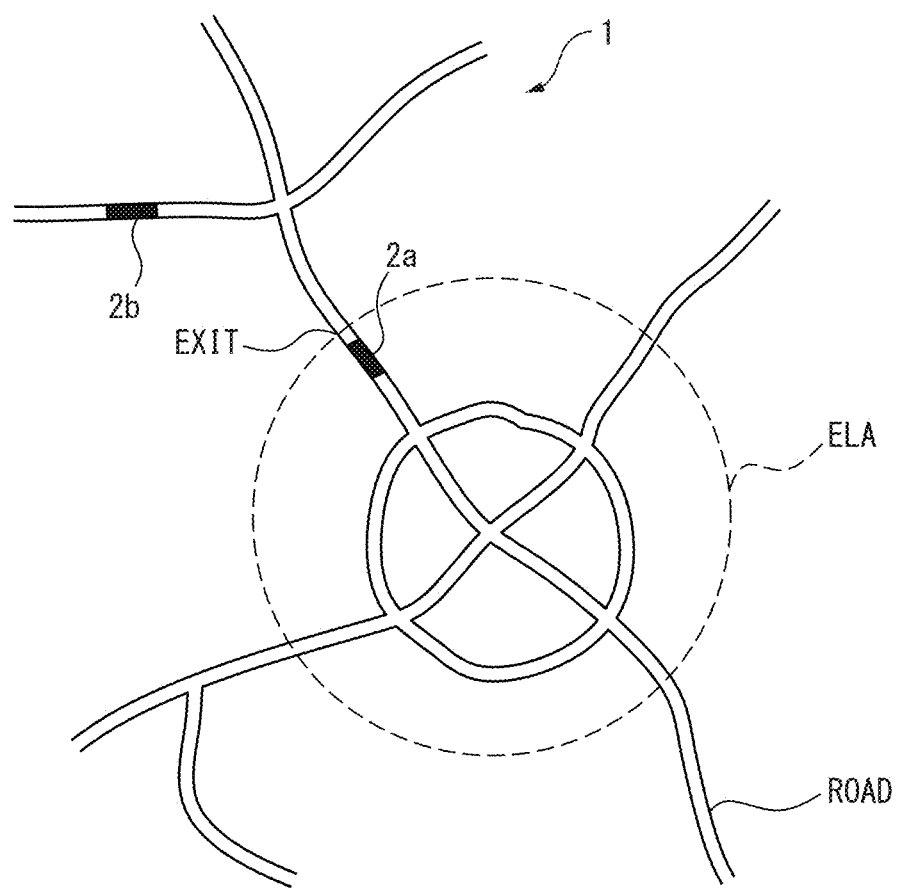
FIG. 4 is a view schematically showing a power supply system according to a first embodiment.

FIG. 4 is a view schematically showing a power supply system 1 according to a first embodiment. The broken line of FIG. 4 shows the boundary of an engine limited operation area ELA. The range surrounded by the broken line corresponds to the engine limited operation area ELA. In the example of FIG. 4, the plurality of roads in the surroundings of the engine limited operation area ELA are connected to roads inside the engine limited operation area ELA. Note that, an engine limited operation area ELA is also referred to as a low emission zone (LEZ). E drive zone, geofencing zone, etc.

The power supply system 1 is provided with a plurality of power supply apparatuses configured so as to transmit power to a vehicle by non-contact. In the present embodiment, the plurality of power supply apparatuses include a first power supply apparatus 2a installed at a first region and a second power supply apparatus 2b installed at a second region different from the first region. The first power supply apparatus 2a and the second power supply apparatus 2b respectively have configurations similar to the above-mentioned power supply apparatus 2.

The first region is positioned on a road directly connected to an exit of the engine limited operation area ELA and is a region where the amount of traffic of vehicles at least temporarily becomes equal to or greater than a predetermined threshold value. Note that, an "exit of the engine limited operation area" means a boundary point of the engine limited operation area when a vehicle leaves the engine limited operation area along the road. Further, a road directly connected to an exit of the engine limited operation area includes the road inside the engine limited operation area and the road outside the engine limited operation area.

On the other hand, the second region is positioned on a road not directly connected to an exit of the engine limited operation area ELA. In the present embodiment, the second region is positioned at the outside of the engine limited operation area ELA and is positioned on a road branched from a road directly connected to an exit of the engine limited operation area ELA. Note that, the second region may be a region which is positioned on a road directly connected to an exit of the engine limited operation area ELA and where the amount of traffic of vehicles is less than the threshold value.

In the present embodiment, the amount of power supply from the first power supply apparatus 2a installed at the first region to a vehicle is made greater than the amount of power supply from the second power supply apparatus 2b installed at the second region to a vehicle. If vehicles move from inside the engine limited operation area ELA to outside the engine limited operation area ELA, most of the vehicles will pass through the first region. For this reason, it is possible to increase the amount of power supply to vehicles from the first power supply apparatus 2a to thereby efficiently supply power to hybrid vehicles leaving the engine limited operation area ELA. Therefore, it is possible to keep down the amount of power consumption due to non-contact power supply to vehicles from the power supply apparatus while keeping the environment in the surroundings of the engine limited operation area from being degraded.

For example, the first power supply apparatus 2a and the second power supply apparatus 2b are configured so that the amount of power supply per unit time to a vehicle from the first power supply apparatus 2a becomes greater than the amount of power supply per unit time to a vehicle from the second power supply apparatus 2b. Further, the first power supply apparatus 2a and the second power supply apparatus 2b may be configured so that the amount of power supply to a vehicle from the first power supply apparatus 2a when the vehicle passes over the first power supply apparatus 2a at a predetermined speed becomes greater than the amount of power supply to a vehicle from the second power supply apparatus 2b when the vehicle passes over the second power supply apparatus 2b at a predetermined speed.

The amount of power supply to a vehicle from the power supply apparatus 2a or 2b is, for example, adjusted by changing at least one of the strength and range of generation of the alternating current magnetic field generated from the power transmission apparatus 4. The higher the strength of the alternating current magnetic field, the greater the amount of power supply to a vehicle, while the broader the range of generation of the alternating current magnetic field, the greater the amount of power supply to a vehicle. The strength of the alternating current magnetic field changes according to the physical parameters of the power transmission side resonance circuit 43 (for example, the turns of the coil 44 etc.), the value of voltage of the alternating current power supplied to the power transmission side resonance circuit 43, etc., while the range of generation of the alternating current magnetic field changes according to the range of installation of the coil 44 of the power transmission side resonance circuit 43 etc.

Further, in the present embodiment, the first region where the first power supply apparatus 2a is installed is positioned within the engine limited operation area ELA. For this reason, it is possible to charge the battery of a hybrid vehicle before the hybrid vehicle leaves the engine limited operation area ELA and possible to more effectively keep down startup of an internal combustion engine right after a hybrid vehicle leaves the engine limited operation area ELA.

Further, the power supply system 1 may be provided with a plurality of first power supply apparatuses installed in a plurality of first regions and a plurality of second power supply apparatuses installed in a plurality of second regions. In this case, the amount of power supply to a vehicle from each of the plurality of first power supply apparatuses is made greater than the amount of power supply to a vehicle from each of the plurality of second power supply apparatuses.

Second Embodiment

The power supply system according to a second embodiment is basically similar to the power supply system according to the first embodiment except for the points explained below. For this reason, below, the second embodiment of the present disclosure will be explained focusing on parts different from the first embodiment.

Figure 5:
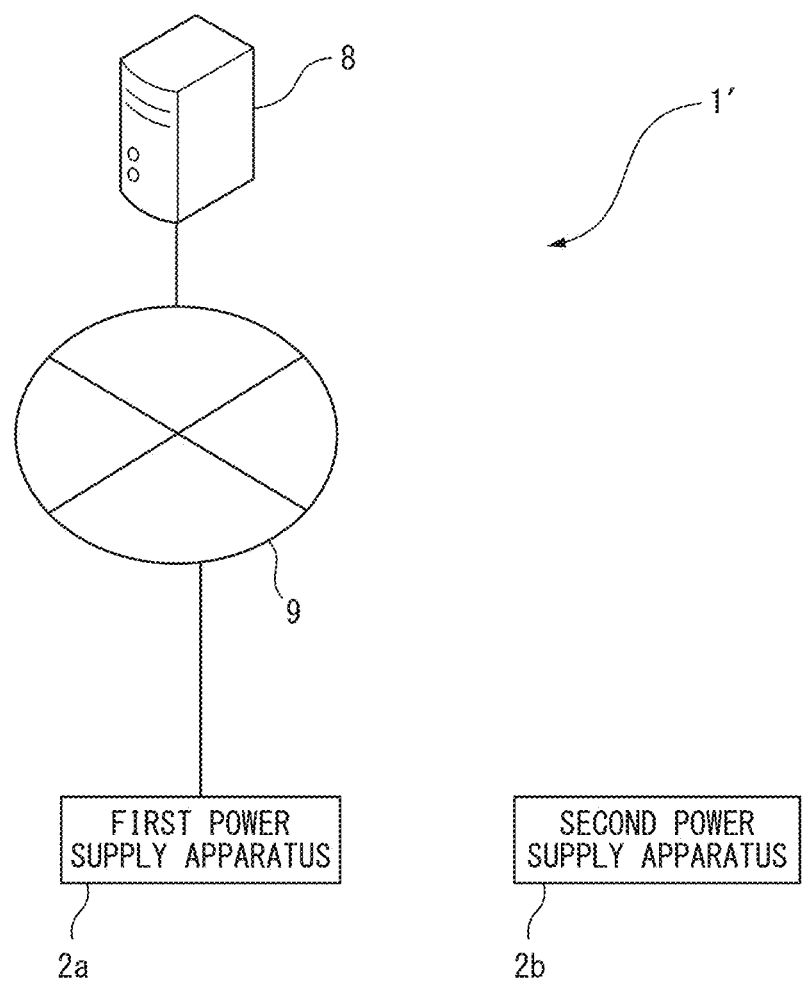
FIG. 5 is a view schematically showing a power supply system according to a second embodiment.

FIG. 5 is view schematically showing the power supply system 1' according to the second embodiment. The power supply system 1' is provided with a plurality of power supply apparatuses and a server 8. In the same way as the first embodiment, the plurality of power supply apparatuses comprise a first power supply apparatus 2a installed in a first region and a second power supply apparatus 2b installed in a second region different from the first region. In the second embodiment, the controller 6 of the first power supply apparatus 2a has a communication interface for connecting the first power supply apparatus 2a to the communication network 9. That is, the first power supply apparatus 2a can communicate with the outside of the first power supply apparatus 2a through the communication network 9.

Figure 6:
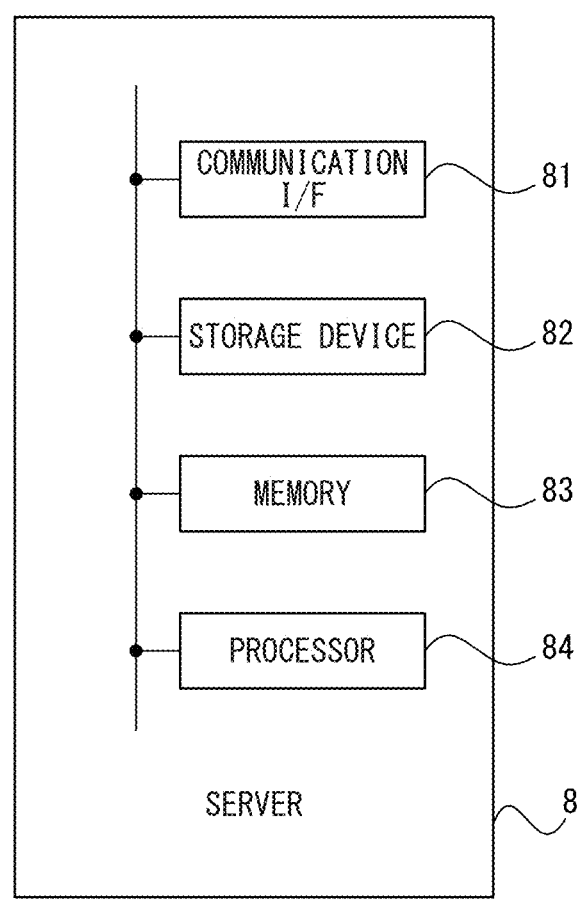
FIG. 6 is a view schematically showing a configuration of a server.

FIG. 6 is a view schematically showing the configuration of the server 8. The server 8 is provided with a communication interface 81, a storage device 82, a memory 83, and a processor 84. The communication interface 81, the storage device 82, and the memory 83 are connected to the processor 84 through signal wires. Note that, the server 8 may be further provided with a keyboard and a mouse or other such input devices, a display or other such output device, etc. Further, the server 8 may be configured by a plurality of computers.

The communication interface 81 has an interface circuit for connecting the server 8 to the communication network 9 and enables communication between the server 8 and the outside of the server 8. For example, the server 8 can communicate with the first power supply apparatus 2a through the communication network 9. The communication interface 81 is one example of a communicating part of the server 8.

The storage device 82, for example, has a hard disk drive (HDD), a solid state drive (SSD), or an optical recording medium and their access devices. The storage device 82 stores various data, for example, stores information relating to the engine limited operation area ELA, information relating to the first power supply apparatus 2a, a computer program for the processor 84 to perform various processing, etc. The storage device 82 is one example of a storage part of the server 8.

The memory 83 is a nonvolatile semiconductor memory (for example, RAM). The memory 83, for example, temporarily stores various data etc. used when various processing is performed by the processor 84. The memory 83 is one example of a storage part of the server 8.

The processor 84 has one or more CPUs and their peripheral circuits and performs various processing. Note that, the processor 84 may further have a logic unit, an arithmetic unit, or a graphic unit or other such processing circuit. The processor 84 is one example of a control part of the server 8.

As explained above, it is possible to supply power to vehicles from the first power supply apparatus 2a so as to charge the batteries of vehicles leaving the engine limited operation area ELA. However, if there are few vehicles passing through the first region where the first power supply apparatus 2a is installed, there is little need for increasing the amount of power supply to vehicles from the first power supply apparatus 2a.

For this reason, in the second embodiment, the server 8 acquires the amount of traffic of vehicles in the first region. When the amount of traffic of vehicles in the first region is equal to or greater than a predetermined threshold value, the server 8 transmits to the first power supply apparatus 2a an instruction to increase the amount of power supply to a vehicle. If receiving an instruction to increase the amount of power supply to a vehicle, the first power supply apparatus 2a increases the power supply to a vehicle. That is, when the amount of traffic of vehicles in the first region is equal to or greater than the threshold value, the first power supply apparatus 2a increases the amount of power supply to a vehicle, compared to when the amount of traffic is less than the threshold value. In this way, by increasing the amount of power supply from the first power supply apparatus 2a to a vehicle only when many vehicles pass through the first region, it is possible to more effectively keep down the amount of power consumption due to non-contact power supply to vehicles. Note that, the "amount of traffic of vehicles in the first region" means the number of vehicles passing through the first region during a predetermined time period.

Note that, the amount of power supply 2b to a vehicle from the second power supply apparatus is made smaller than the amount of power supply to a vehicle from the first power supply apparatus 2a when the amount of traffic of vehicles in the first region is equal to or greater than the threshold value, and for example, it is made the same as the amount of power supply to a vehicle from the first power supply apparatus 2a when the amount of traffic of vehicles in the first region is less than the threshold value.

Figure 7:
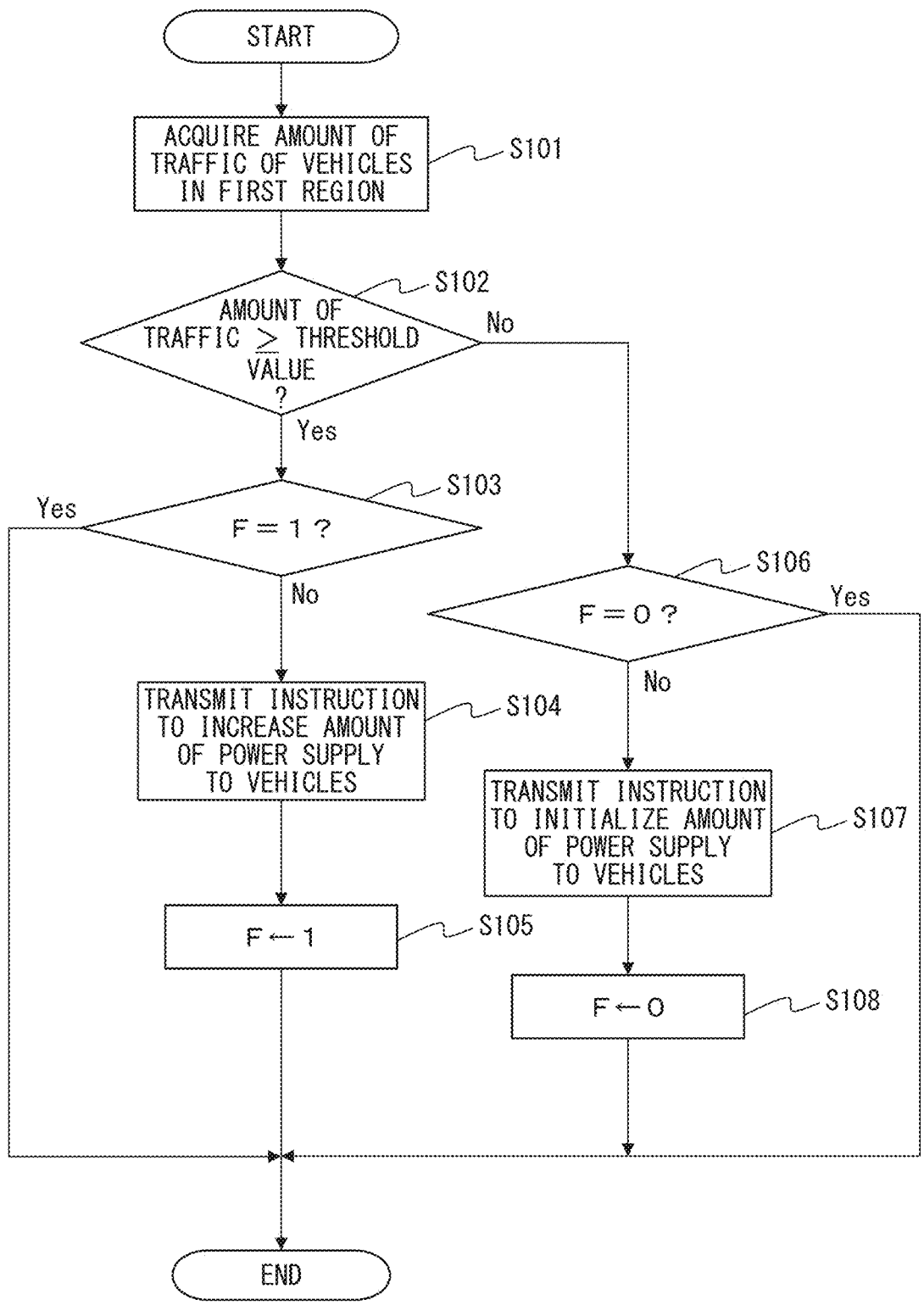
FIG. 7 is a flow chart showing a control routine performed in the server in the second embodiment.

FIG. 7 is a flow chart showing a control routine performed at the server 8 in the second embodiment. The present control routine is repeatedly performed by the processor 84 of the server 8 at predetermined execution intervals.

First, at step S101, the processor 84 acquires the amount of traffic of vehicles in the first region. For example, a plurality of vehicles periodically transmit position information of the vehicles through the communication network 9 to the server 8. The processor 84 of the server 8 calculates the number of vehicles passing through the first region during a predetermined time period up to a current time based on the position information of the vehicles to thereby obtain the amount of traffic of vehicles in the first region.

Note that, a metal detector, a photoelectric sensor, a camera, or a road side device or other such device able to detect vehicles may be provided at the first region and the output of such a device may be transmitted to the server 8 instead of position information of the vehicles. Further, an operator of the server 8 etc. may input the amount of traffic of vehicles in the first region to the server 8, and the processor 84 may acquire the value input to the server 8 as the amount of traffic of vehicles in the first region. Further, the processor 84 may acquire the amount of traffic of vehicles in the first region from VICS® information or other such road traffic information.

Next, at step S102 the processor 84 judges whether the amount of traffic of vehicles in the first region is equal to or greater than the threshold value. The threshold value is determined in advance and, for example, is set to 10 vehicles per hour to 1000 vehicles per hour.

If at step S102 it is judged that the amount of traffic is equal to or greater than the threshold value, the present control routine proceeds to step S103. At step S103, the processor 84 judges whether a power supply flag F is "1". The power supply flag F is set to "1" when the instruction to increase the amount of power supply to a vehicle is transmitted to the first power supply apparatus 2a and is set to zero when an instruction to initialize the amount of power supply to a vehicle is transmitted to the first power supply apparatus 2a. Note that, the initial value of the power supply flag F is zero.

If at step S103 it is judged that the power supply flag F is zero, the present control routine proceeds to step S104. At step S104, the processor 84 transmits an instruction to increase the amount of power supply to a vehicle to the first power supply apparatus 2a through the communication network 9. Next, at step S105, the processor 84 sets the power supply flag F to "1". After step S105, the present control routine ends. On the other hand, if at step S103 it is judged that the power supply flag F is "1", since an instruction to increase the amount of power supply to a vehicle has already been transmitted, the present control routine skips steps S104 and S105 and ends.

Further, if at step S102 it is judged that the amount of traffic is less than the threshold value, the present control routine proceeds to step S106. At step S106, the processor 84 judges whether the power supply flag F is zero. If it is judged that the power supply flag F is "1", the present control routine proceeds to step S107.

At step S107, the processor 84 transmits an instruction to initialize the amount of power supply to a vehicle to the first power supply apparatus 2a through the communication network 9. Next, at step S108, the processor 84 sets the power supply flag F to zero. After step S108, the present control routine ends. On the other hand, if at step S106 it is judged that the power supply flag F is zero, since an instruction to initialize the amount of power supply to a vehicle has already been transmitted, the present control routine skips steps S107 and S108 and ends.

Figure 8:
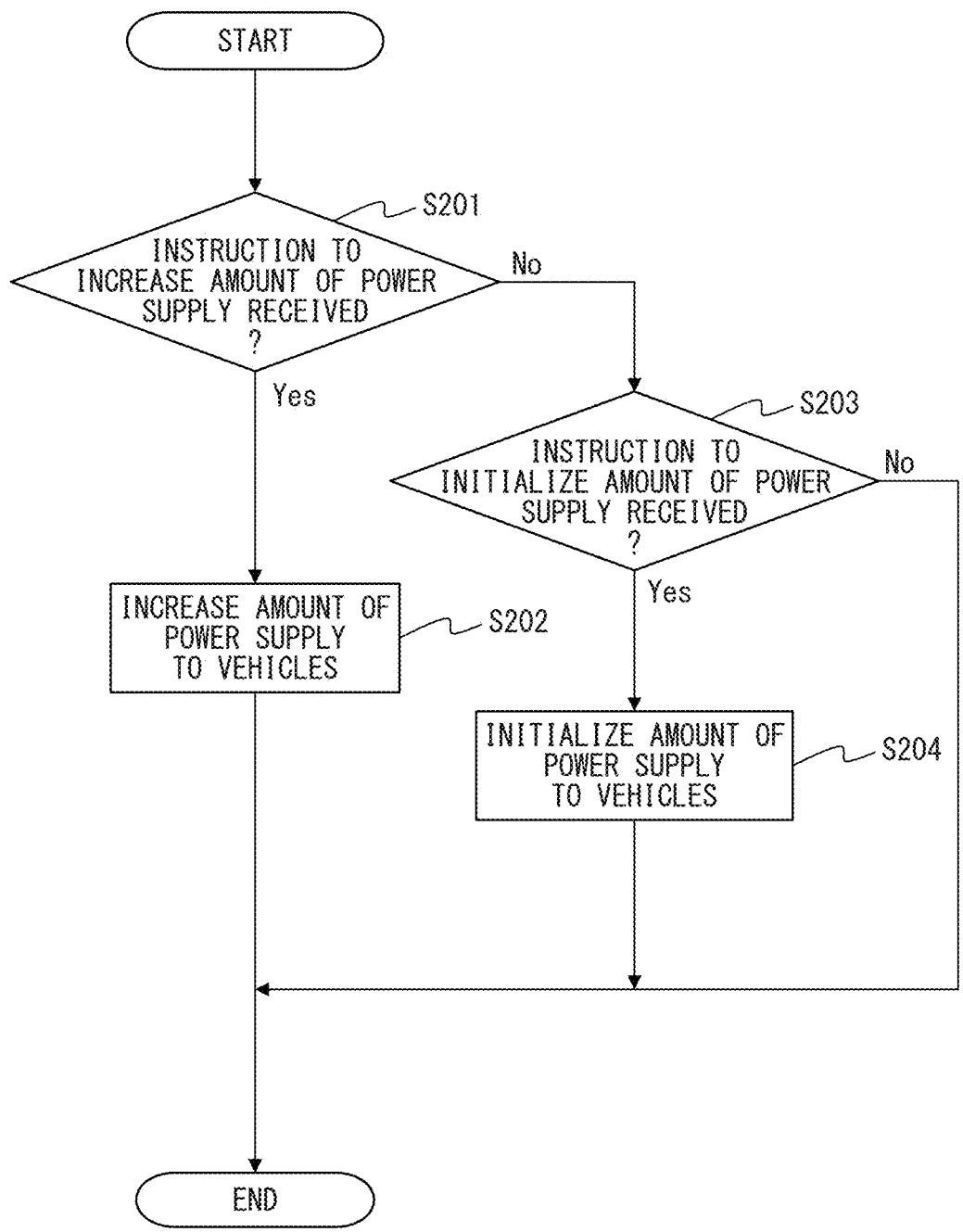
FIG. 8 is a flow chart showing a control routine performed in a first power supply apparatus in the second embodiment.

FIG. 8 is a flow chart showing a control routine performed at the first power supply apparatus 2a in the second embodiment. The present control routine is repeatedly performed at predetermined execution intervals by the processor 62 of the controller 6 of the first power supply apparatus 2a.

First, at step S201, the processor 62 judges whether it has received an instruction to increase the amount of power supply to a vehicle. If it is judged that it has received an instruction to increase the amount of power supply to a vehicle, the present control routine proceeds to step S202.

At step S202, the processor 62 increases the amount of power supply from the first power supply apparatus 2a to a vehicle over the initial value. For example, the processor 62 raises the set value of the value of voltage of the alternating current power supplied to the power transmission side resonance circuit 43 of the power transmission apparatus 4 at the time of power supply from the initial value. After step S202, the present control routine ends.

On the other hand, if at step S201 it is judged that it has not received an instruction to increase the amount of power supply to a vehicle, the present control routine proceeds to step S203. At step S203, the processor 62 judges whether it has received an instruction to initialize the amount of power supply to a vehicle. If it is judged that it has received an instruction to initialize the amount of power supply to a vehicle, the present control routine proceeds to step S204.

At step S204, the processor 62 initializes the amount of power supply to a vehicle from the first power supply apparatus 2a. That is, the processor 62 returns the amount of power supply to a vehicle from the first power supply apparatus 2a to the initial value. For example, the processor 62 sets the set value of the value of voltage of the alternating current power supplied to the power transmission side resonance circuit 43 of the power transmission apparatus 4 at the time of power supply to the initial value. After step S204, the present control routine ends. On the other hand, if at step S203 it is judged that it has not received an instruction to initialize the amount of power supply to a vehicle, the present control routine ends.

Note that, the server 8 may be omitted, the first power supply apparatus 2a may acquire the amount of traffic of vehicles in the first region, the amount of power supply to a vehicle may be increased when the amount of traffic is equal to or greater than the threshold value, and the amount of power supply to a vehicle may be initialized when the amount of traffic is less than the threshold value. Further, the server 8 may transmit the amount of traffic of vehicles in the first region to the first power supply apparatus 2a through the communication network 9, and the first power supply apparatus 2a may increase the amount of power supply to a vehicle when the amount of traffic is equal to or greater than a threshold value and may initialize the amount of power supply to a vehicle when the amount of traffic is less than the threshold value.

Third Embodiment

The power supply system according to a third embodiment is basically similar to the power supply system according to the second embodiment except for the points explained below. For this reason, below, the third embodiment of the present disclosure will be explained focusing on parts different from the second embodiment.

In the second embodiment, when the amount of traffic of vehicles in the first region is equal to or greater than the predetermined threshold value, the server 8 transmits to the first power supply apparatus 2a an instruction to increase the amount of power supply to a vehicle. That is, when the amount of traffic of vehicles in the first region is large, the amount of power supply to a vehicle from the first power supply apparatus 2a is increased. However, if the concentration of carbon dioxide in the atmosphere in the vicinity of the exit of the engine limited operation area ELA is already high, it is necessary to avoid as much as possible internal combustion engines being started up when vehicles leave the engine limited operation area ELA.

For this reason, in the third embodiment, the server 8 acquires the concentration of carbon dioxide in the atmosphere in the vicinity of the exit of the engine limited operation area ELA and sets the threshold value based on this concentration of carbon dioxide. Due to this, since the amount of power supply to a vehicle is set considering not only the amount of traffic of vehicles, but also the state of the atmosphere, it is possible to more effectively keep the environment at the surroundings of the engine limited operation area ELA from being degraded.

Figure 9:
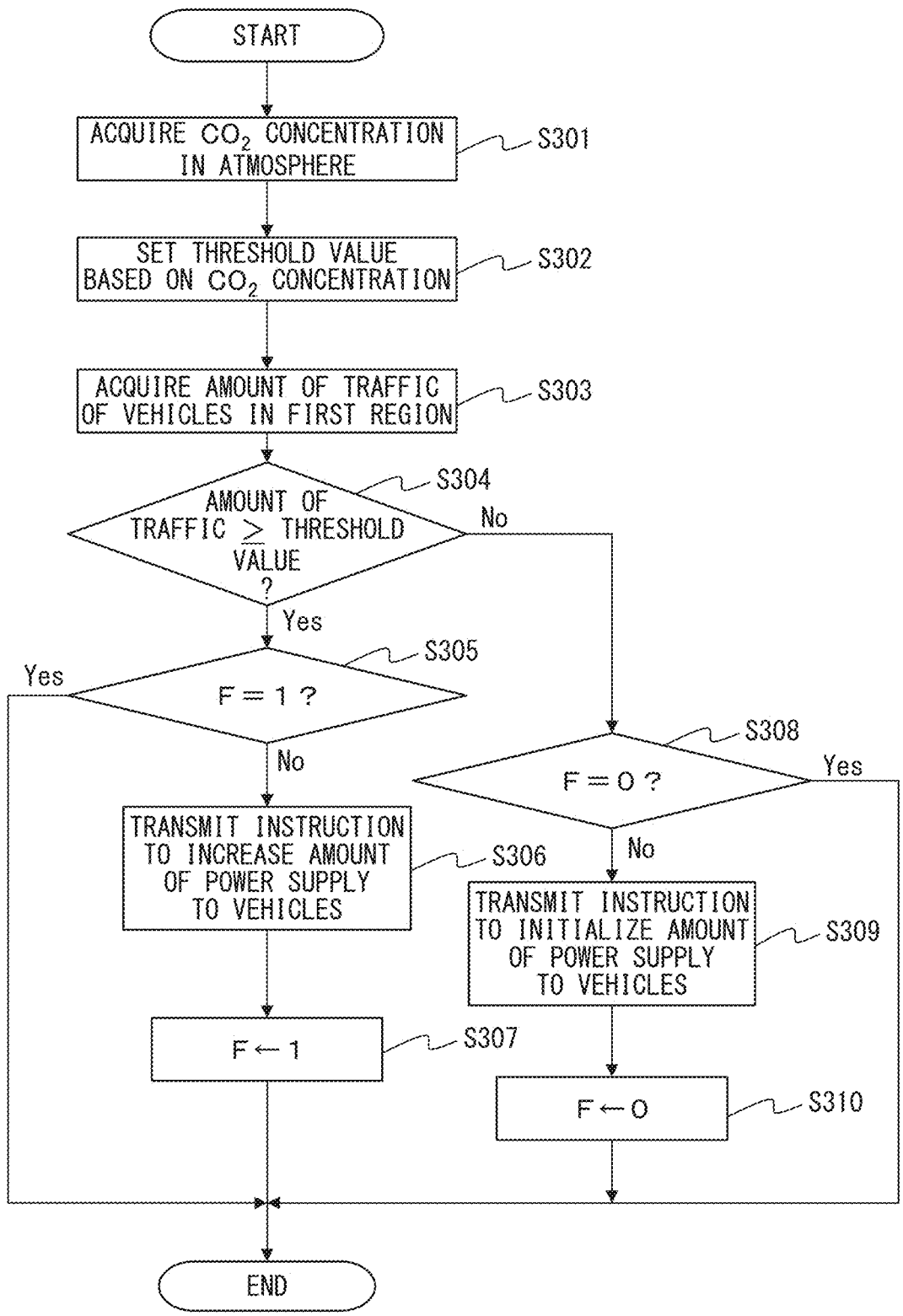
FIG. 9 is a flow chart showing a control routine performed in the server in a third embodiment.

FIG. 9 is a flow chart showing a control routine performed at the server 8 in the third embodiment. The present control routine is repeatedly performed by the processor 84 of the server 8 at predetermined execution intervals.

First, at step S301, the processor 84 acquires the concentration of carbon dioxide in the atmosphere in the vicinity of the exit of the engine limited operation area ELA. For example, a $CO_2$ sensor for detecting the concentration of carbon dioxide in the atmosphere is arranged in the vicinity of the exit of the engine limited operation area ELA, and the output of this $CO_2$ sensor is periodically transmitted through the communication network 9 to the server 8. If the first region in which the first power supply apparatus 2a is installed is positioned at the inside of the engine limited operation area ELA, the $CO_2$ sensor is arranged at the exit of the engine limited operation area ELA etc., while if the first region is positioned at the outside of the engine limited operation area ELA, it is arranged at the first region etc.

Next, at step S302, the processor 84 sets the threshold value based on the concentration of carbon dioxide in the atmosphere in the vicinity of the exit of the engine limited operation area ELA. Specifically, when the concentration of carbon dioxide in the atmosphere is equal to or greater than a predetermined concentration, the processor 84 reduces the threshold value compared to when the concentration of carbon dioxide in the atmosphere is less than the predetermined concentration. For example, the threshold value is made smaller linearly or in stages (steps) as the concentration of carbon dioxide in the atmosphere becomes higher.

Next, at step S303, in the same way as step S101 of FIG. 7, the processor 84 acquires the amount of traffic of vehicles in the first region. Next, at step S304 the processor 84 judges whether the amount of traffic of vehicles in the first region is equal to or greater than a threshold value. As the value of the threshold value at this judgment, the value set at step S302 is used.

If at step S304 it is judged that the amount of traffic is equal to or greater than the threshold value, in the same way as steps S103 to S105 of FIG. 7, steps S305 to S307 are performed. On the other hand, if at step S304 it is judged that the amount of traffic is less than the threshold value, in the same way as steps S106 to S108 of FIG. 7, steps S308 to S310 are performed.

Fourth Embodiment

The power supply system according to a fourth embodiment is basically similar to the power supply system according to the first embodiment except for the points explained below. For this reason, below, the fourth embodiment of the present disclosure will be explained focusing on parts different from the first embodiment.

In the above-mentioned way, in the first power supply apparatus 2*a*, the amount of power supply to a vehicle is made greater than the second power supply apparatus 2*b*. However, if a vehicle passing through the first region where the first power supply apparatus 2*a* is installed is not provided with an internal combustion engine, there is little need for increasing the amount of power supply to a vehicle from the first power supply apparatus 2*a*.

For this reason, in the fourth embodiment, the first power supply apparatus 2*a* increases the amount of power supply to a vehicle only if a hybrid vehicle passes through the first region. That is, w % ben a hybrid vehicle passes through the first region, the first power supply apparatus 2*a* increases the amount of power supply to a vehicle compared to when an electric vehicle passes through the first region. Due to this, it is possible to keep the environment at the surroundings of the engine limited operation area ELA from being degraded while keeping down more the amount of power consumption due to non-contact power supply to vehicles from the power supply apparatus.

Note that, the amount of power supply to a vehicle from the second power supply apparatus 2*b* is made smaller than the amount of power supply from the first power supply apparatus 2*a* to a vehicle when a hybrid vehicle passes through the first region, and for example, is made the same as the amount of power supply to a vehicle from the first power supply apparatus 2*a* when an electric vehicle passes through the first region.

Figure 10:
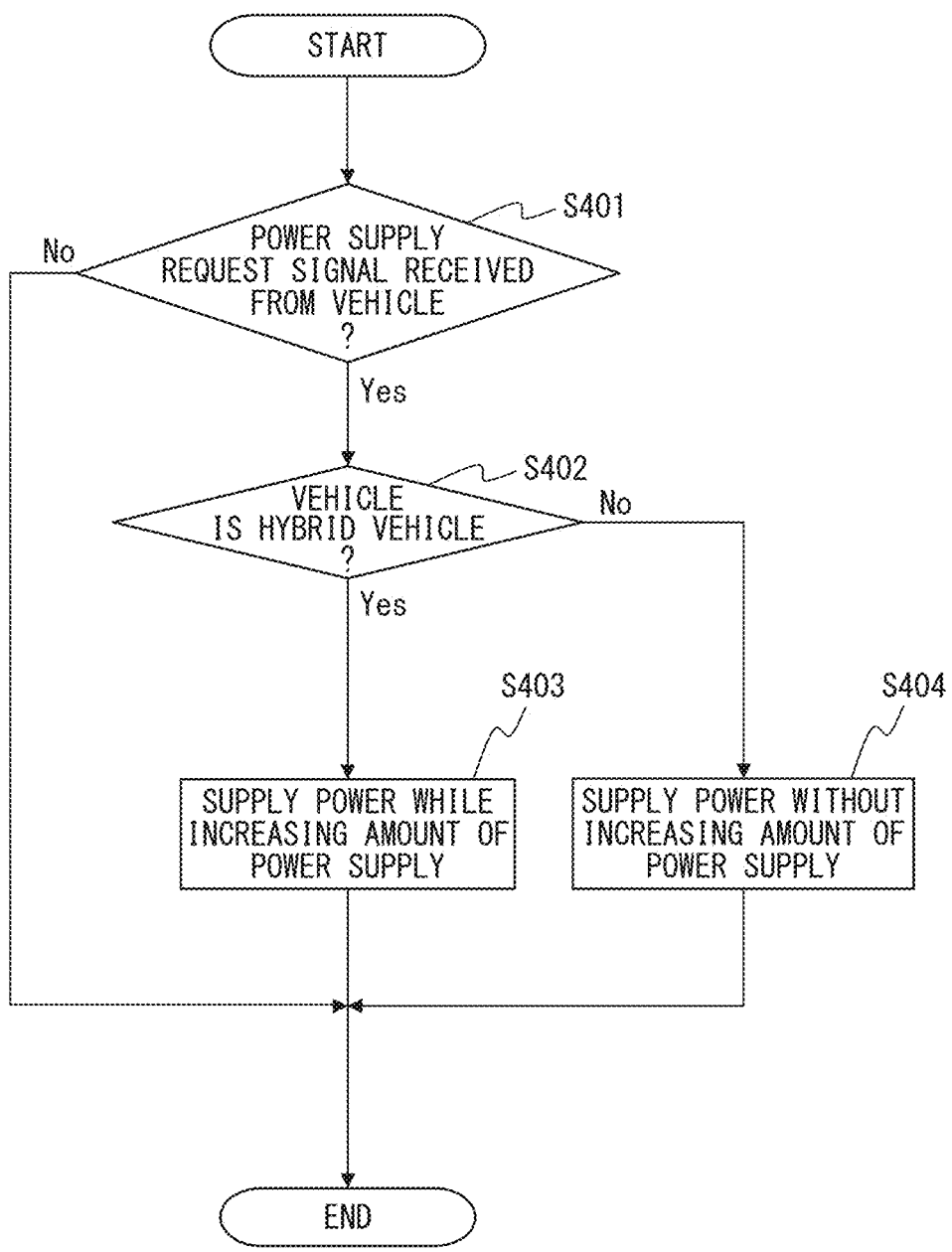
FIG. 10 is a flow chart showing a control routine performed in a first power supply apparatus in a fourth embodiment.

FIG. 10 is a flow chart showing a control routine performed at the first power supply apparatus 2*a* in the fourth embodiment. The present control routine is repeatedly performed at predetermined execution intervals by the processor 62 of the controller 6 of the first power supply apparatus 2*a*.

First, at step S401 the processor 62 judges whether it has received a power supply request signal from a vehicle. If it is judged that it has not received a power supply request signal, the present control routine ends. On the other hand, if it is judged that it has received a power supply request signal, the present control routine proceeds to step S402.

At step S402, the processor 62 judges whether the vehicle transmitting the power supply request signal is a hybrid vehicle. For example, vehicle type information is transmitted together with a power supply request signal from the vehicle to the first power supply apparatus 2*a*. The processor 62 judges whether the vehicle transmitting the power supply request signal is a hybrid vehicle based on the vehicle type information.

If at step S402 it is judged that the vehicle is not a hybrid vehicle, the present control routine proceeds to step S404. At step S404, the processor 62 supplies power to a vehicle without increasing the amount of power supply. For example, the processor 62 sets the value of voltage of the alternating current power supplied to the power transmission side resonance circuit 43 of the power transmission apparatus 4 to an initial value. After step S404, the present control routine ends.

On the other hand, if at step S402 it is judged that the vehicle is a hybrid vehicle, the present control routine proceeds to step S403. At step S403, the processor 62 increases the amount of power supply to supply power to a vehicle. For example, the processor 62 sets the value of voltage of the alternating current power supplied to the power transmission side resonance circuit 43 of the power transmission apparatus 4 to a value higher than the initial value. After step S403, the present control routine ends.

Further, when the SOC of the battery of the hybrid vehicle is high, there is little need to increase the amount of power supply to vehicles. For this reason, the first power supply apparatus 2*a* may increase the amount of power supply to a vehicle only if a hybrid vehicle with a SOC of the battery of equal to or less than a predetermined value is passing through the first region. The predetermined value is set to a value higher than the value of the SOC at which startup of an internal combustion engine becomes necessary. In this case, between step S402 and step S403, the processor 62 judges whether SOC of the battery of the hybrid vehicle is equal to or less than a predetermined value. If the judgment is positive, step S403 is performed, while if the judgment is negative, step S404 is performed. The value of the SOC of the battery is, for example, transmitted together with the power supply request signal from vehicle to the first power supply apparatus 2*a*.

Fifth Embodiment

The power supply system according to a fifth embodiment is basically similar to the power supply system according to the first embodiment except for the points explained below. For this reason, below, the fifth embodiment of the present disclosure will be explained focusing on parts different from the first embodiment.

In the fifth embodiment, the engine limited operation area ELA is set as a limited time area where operation of internal combustion engines is prohibited or restricted in predetermined hours. For example, in an engine limited operation area ELA, operation of internal combustion engines is prohibited or restricted in the hours of 6:00 to 10:00 in each day and operation of internal combustion engines is allowed in other hours. Note that, predetermined hours may be changed in accordance with the day, date, etc.

If the engine limited operation area ELA is a limited time area, the opportunities of internal combustion engines being started up outside of the engine limited operation area ELA increase in predetermined hours. Therefore, in the fifth embodiment, the first power supply apparatus 2a increases the power supply to a vehicle only in a predetermined set time period including at least a part of the predetermined hours when operation of internal combustion engines is prohibited or restricted. That is, when the current time is within the predetermined set time period, the first power supply apparatus 2a increases the amount of power supply to a vehicle compared to when the current time is outside the predetermined set time period. Due to this, it is possible to keep the environment in the surroundings of the engine limited operation area ELA from being degraded while keeping down more the amount of power consumption due to non-contact power supply from the power supply apparatus to vehicles.

For example, the end point of the set time period is set to a point after the predetermined hours where operation of internal combustion engines is prohibited or restricted. Due to this, if a hybrid vehicle leaves the engine limited operation area ELA after the predetermined hours end, it is possible to keep the internal combustion engine from being started up. Therefore, it is possible to more effectively keep the environment in the surroundings of the engine limited operation area ELA from being degraded. On the other hand, the starting point of the set time period is, for example, set to a starting point of the predetermined hours where operation of internal combustion engines is prohibited or restricted.

Note that, the amount of power supply from the second power supply apparatus 2b to a vehicle is made smaller than the amount of power supply from the first power supply apparatus 2a to a vehicle at the set time period, and for example, is made the same as the amount of power supply to a vehicle from the first power supply apparatus 2a at a time period other than the set time period.

Figure 11:
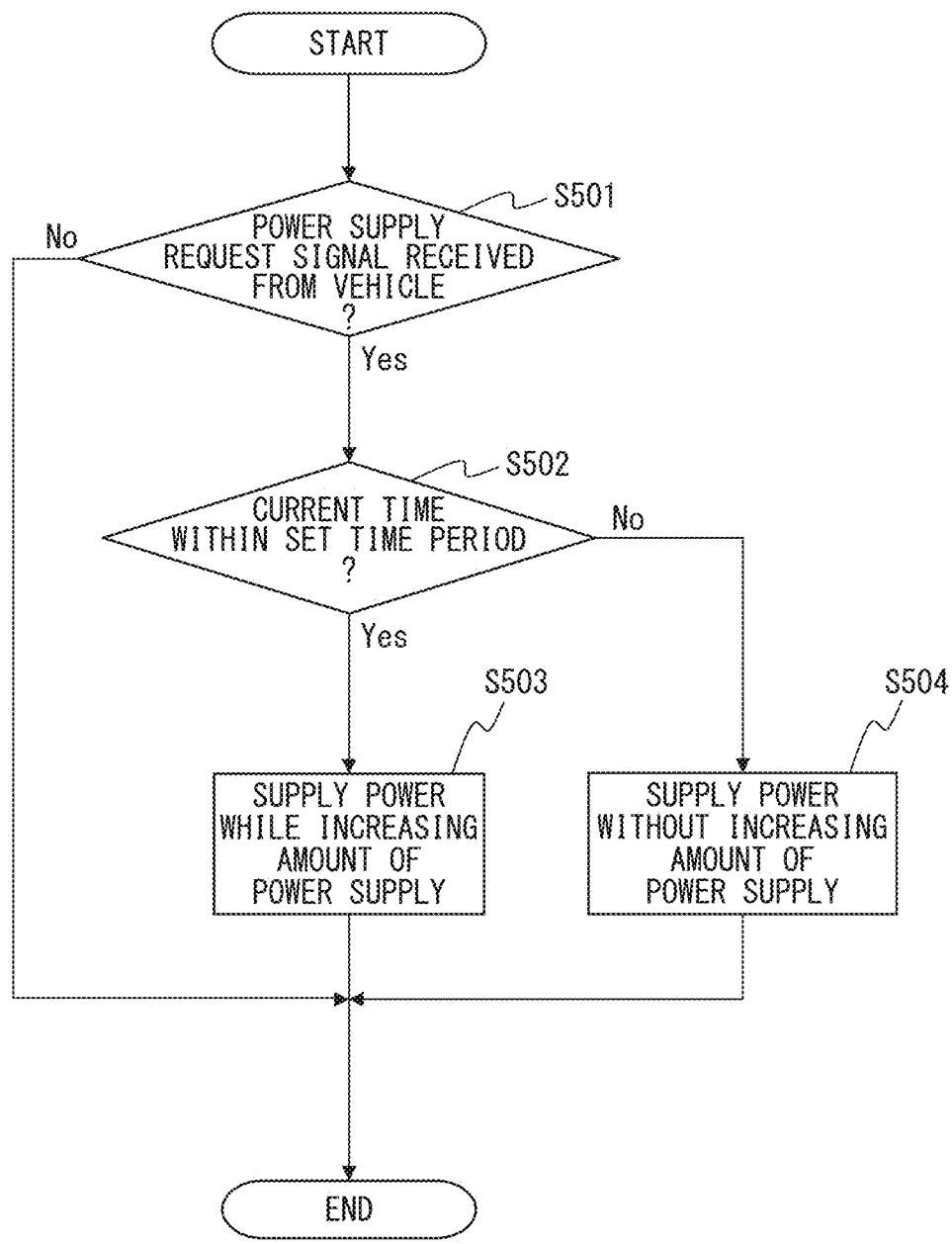
FIG. 11 is a flow chart showing a control routine performed in a first power supply apparatus in a fifth embodiment.

FIG. 11 is a flow chart showing a control routine performed at the first power supply apparatus 2a in the fifth embodiment. The present control routine is repeatedly performed at predetermined execution intervals by the processor 62 of the controller 6 of the first power supply apparatus 2a.

First, at step S501 the processor judges whether it has received a power supply request signal from a vehicle. If it is judged that it has not received a power supply request signal, the present control routine ends. On the other hand, if it is judged that it has received a power supply request signal, the present control routine proceeds to step S502.

At step S502, the processor 62 judges whether the current time is within a set time period. The current time is, for example, acquired from a digital clock provided in the controller 6. Note that, the current time may be acquired from outside of the controller 6. The set time period is set in advance in accordance with the hours in which operation of internal combustion engines is prohibited or restricted in an engine limited operation area ELA and is stored in a memory 61 etc. of the controller 6. Note that, if the hours in which operation of internal combustion engines is prohibited or restricted in an engine limited operation area ELA are changed, the set time period is reset by the manager of the first power supply apparatus 2a etc. in accordance with the content of that change.

If at step S502 it is judged that the current time is outside the set time period, the present control routine proceeds to step S504. At step S504, the processor 62 supplies power to a vehicle without making the amount of power supply increase. For example, the processor 62 sets the value of voltage of the alternating current power supplied to the power transmission side resonance circuit 43 of the power transmission apparatus 4 to an initial value. After step S504, the present control routine ends.

On the other hand, if at step S502 it is judged that the current time is within a set time period, the present control routine proceeds to step S503. At step S503, the processor 62 makes the amount of power supply increase to supply power to a vehicle. For example, the processor 62 sets the value of voltage of the alternating current power supplied to the power transmission side resonance circuit 43 of the power transmission apparatus 4 to a value higher than the initial value After step S503, the present control routine ends.

Other Embodiments

Above, preferred embodiments according to the present disclosure were explained, but the present disclosure is not limited to these embodiments and can be corrected and changed within the language of the claims.

For example, the method of non-contact power supply to vehicles from the power supply apparatus 2a or 2b is not limited to an electromagnetic induction system including magnetic field resonance coupling. Various methods such as an electrical field coupling system transmitting power using an electrical field as a medium can be used.

Further, the above-mentioned embodiments may be worked combined in any way. For example, in the second embodiment or the third embodiment, the first power supply apparatus 2a may increase the amount of power supply to a vehicle only when a hybrid vehicle is passing through the first region, if an instruction to increase the amount of power supply is transmitted from the server 8 to the first power supply apparatus 2a.

Further, in the second embodiment or the third embodiment, the first power supply apparatus 2a may increase the power supply to a vehicle only in a predetermined set time period including at least predetermined hours in which operation of internal combustion engines is prohibited or restricted, if an instruction to increase the amount of power supply is transmitted from the server 8 to the first power supply apparatus 2a. Further, in the second embodiment or the third embodiment, the server 8 may transmit an instruction to increase an amount of power supply to a vehicle to the first power supply apparatus 2a when an amount of traffic of vehicles in the first region is equal to or greater than a threshold value and a current time is within a set time period.

Further, if combining the fourth embodiment and the fifth embodiment, the first power supply apparatus 2a may increase the amount of power supply to a vehicle only if a hybrid vehicle is passing through the first region and a current time is within a predetermined set time period.

REFERENCE SIGNS LIST 1, 1'. power supply system
2. power supply apparatus
2a. first power supply apparatus
2b. second power supply apparatus
3. vehicle
30. internal combustion engine
ELA. engine limited operation area

The invention claimed is:

1. A power supply system comprising a plurality of power supply apparatuses configured to transmit power to a hybrid vehicle by non-contact, wherein
the plurality of power supply apparatuses comprise:
a first power supply apparatus installed in a first region positioned on a road directly connected to an exit of an area in which operation of internal combustion engines is prohibited or restricted and where an amount of traffic of vehicles at least temporarily becomes equal to or greater than a predetermined threshold value; and
a second power supply apparatus installed in a second region different from the first region, and
an amount of power supplied per unit time from the first power supply apparatus to the hybrid vehicle is made greater than an amount of power supplied per unit time from the second power supply apparatus to the hybrid vehicle.

2. The power supply system according to claim 1, wherein the first region is positioned in the area.

3. The power supply system according to claim 1, wherein the first power supply apparatus increases the amount of power supplied per unit time to the hybrid vehicle when the amount of traffic of vehicles in the first region is equal to or greater than the threshold value, compared to when the amount of traffic is less than the threshold value.

4. The power supply system according to claim 3, further comprising a server able to communicate with the first power supply apparatus, wherein
the server is configured to:
acquire the amount of traffic of vehicles in the first region and, when the amount of traffic is equal to or greater than the threshold value, and
transmit an instruction to increase the amount of power supplied per unit time to the hybrid vehicle to the first power supply apparatus.

5. The power supply system according to claim 4, wherein the server is configured to acquire a concentration of carbon dioxide in the atmosphere in a vicinity of the exit of the area and sets the threshold value based on the concentration of carbon dioxide.

6. The power supply system according to claim 1, wherein the first power supply apparatus is configured to increase the amount of power supply per unit time in response to detection of the hybrid vehicle passing through the first region.

7. The power supply system according to claim 1, wherein the first power supply apparatus is configured to increase the amount of power supply per unit time to the hybrid vehicle in response to an a state of charge (SOC) of a battery of the hybrid vehicle being equal to or less than a predetermined value.

8. The power supply system according to claim 1, wherein
the area is a limited time area where operation of internal combustion engines is prohibited or restricted in predetermined hours, and
the first power supply apparatus is configured to increase the amount of power supply per unit time to the hybrid vehicle only in a predetermined set time period including at least a part of the predetermined hours.

9. The power supply system according to claim 8, wherein an end point of the set time period is set to a point after the predetermined hours.

10. A power supply apparatus configured to:
transmit power to a hybrid vehicle by non-contact, wherein the power supply apparatus is installed in a predetermined region on a road directly connected to an exit of an area in which operation of internal combustion engines is prohibited or restricted, and
increase an amount of power supply per unit time to the hybrid vehicle when an amount of traffic of vehicles in the predetermined region is equal to or greater than a predetermined threshold value, compared to when the amount of traffic is less than the threshold value.

11. A power supply method using a plurality of power supply apparatuses configured to transmit power to a hybrid vehicle by non-contact, wherein the method comprises:
supplying a first power per unit time from a first power supply apparatus of the plurality of power supply apparatuses installed in a first region positioned on a road directly connected to an exit of an area in which operation of internal combustion engines is prohibited or restricted and where an amount of traffic of vehicles at least temporarily becomes equal to or greater than a predetermined threshold value; and
supplying a second power per unit time from a second power supply apparatus of the plurality of power supply apparatuses installed in a second region different from the first region, wherein an amount of the first power per unit time is greater than an amount of the second power per unit time.

* * * * *